United States Patent
Ma et al.

(10) Patent No.: US 10,824,578 B2
(45) Date of Patent: Nov. 3, 2020

(54) BITWISE WRITING APPARATUS FOR SYSTEM-ON-CHIP SYSTEM

(71) Applicant: C-SKY Microsystems Co., Ltd., Hangzhou, Zhejiang (CN)

(72) Inventors: Aiyong Ma, Hangzhou (CN); Bo Sun, Hangzhou (CN); Baolin Xia, Hangzhou (CN); Xianshao Chen, Hangzhou (CN)

(73) Assignee: C-SKY Microsystems Co., Ltd., Hangzhou, Zhejiang (CN)

(*) Notice: Subject to any disclaimer, the term of this patent is extended or adjusted under 35 U.S.C. 154(b) by 0 days.

(21) Appl. No.: 16/479,580

(22) PCT Filed: Dec. 25, 2018

(86) PCT No.: PCT/CN2018/123486
§ 371 (c)(1),
(2) Date: Jul. 19, 2019

(87) PCT Pub. No.: WO2019/128987
PCT Pub. Date: Jul. 4, 2019

(65) Prior Publication Data
US 2019/0370200 A1     Dec. 5, 2019

(30) Foreign Application Priority Data
Dec. 28, 2017 (CN) .......................... 2017 1 1465004

(51) Int. Cl.
*G06F 13/38* (2006.01)
*G06F 13/36* (2006.01)
(Continued)

(52) U.S. Cl.
CPC ........ *G06F 13/362* (2013.01); *G06F 13/1668* (2013.01)

(58) Field of Classification Search
None
See application file for complete search history.

(56) References Cited

U.S. PATENT DOCUMENTS 9,607,682 B1    3/2017    Diamant et al.
2011/0276735 A1 11/2011    Cho et al.

FOREIGN PATENT DOCUMENTS

CN    101477504 A    7/2009
CN    101950279 A    1/2011
(Continued)

OTHER PUBLICATIONS

International Search Report and Written Opinion issued in related International Application No. PCT/CN2018/123486, dated Mar. 27, 2019 (8 pgs.).

(Continued)

*Primary Examiner* — Scott C Sun
(74) *Attorney, Agent, or Firm* — Finnegan, Henderson, Farabow, Garrett & Dunner LLP

(57) ABSTRACT

Provided is a bitwise writing apparatus for a SOC system. The apparatus includes a slave device interface module, a decoding module and a master device interface module. The slave device interface module is configured to receive a write request sent by a master device interface of a bus controller and send the write request to the decoding module. The decoding module is configured to receive the write request sent by the slave device interface module, decode the write request and send valid information after the decoding to the master device interface module. The master device interface module is configured to receive the valid information sent by the decoding module, read data in a destination address, perform a bitwise operation for the read data to obtain new data, send a write request to a slave device interface of the bus controller and write the obtained new data into a peripheral register corresponding to the destination address. The system can effectively reduce the instruction storage space and thereby reduce the chip area and lower the chip cost.

18 Claims, 5 Drawing Sheets

(51) Int. Cl.
*G06F 13/362* (2006.01)
*G06F 13/16* (2006.01)
*G06F 3/06* (2006.01)

(56) References Cited

FOREIGN PATENT DOCUMENTS

| CN | 103605632 A | 2/2014 |
| CN | 106940684 A | 7/2017 |
| CN | 108170470 A | 6/2018 |

OTHER PUBLICATIONS

First Chinese Search Report issued in corresponding Chinese Application No. 201711465004.7 dated Jan. 14, 2020 (1 page).

BITWISE WRITING APPARATUS FOR SYSTEM-ON-CHIP SYSTEM

CROSS-REFERENCE TO RELATED APPLICATIONS

This application is a national stage filing under 35 U.S.C. § 371 of International Application No. PCT/CN2018/123486, filed on Dec. 25, 2018, and published as WO 2019/128987 A1, which claims the benefits of priority to Chinese application number 201711465004.7, filed Dec. 28, 2017, both of which are incorporated herein by reference in their entireties.

BACKGROUND

At present, along with the development of the mobile Internet and the increasing maturation of System-on-chip (SOC) chip design technologies, markets and consumers have higher requirements for embedded system products. It is especially important to reduce the area of an SOC chip in a portable smart device powered by a battery.

The area occupied by a storage module accounts for a large proportion of the chip area, and accordingly reducing the area of the storage module poses a challenge to the architecture, instruction set design, and division of work between software and hardware. In the conventional systems, dedicated hardware modules are designed in some SOC systems to reduce the instruction storage space. Multiple instructions used frequently are implemented in hardware. But the conventional systems have several technical problems.

SUMMARY OF DISCLOSURE

The present disclosure provides a bitwise writing apparatus for an SOC system. The apparatus is connected to a master device interface of a bus controller and a slave device interface of the bus controller, and the apparatus comprises a slave device interface module, a decoding module and a master device interface module, wherein the slave device interface module is configured to receive a write request and send the write request to the decoding module, the decoding module is configured to decode the write request and send valid information after the decoding to the master device interface module, the master device interface module is configured to perform a bitwise operation for read data to obtain new data, and the slave device interface module configured to control and receive a valid write request.

DETAILED DESCRIPTIONS

To make the objectives, technical solutions, and advantages of the embodiments of the present disclosure clearer, the technical solutions in the embodiments of the present disclosure are described below with reference to the accompanying drawings in the embodiments of the present disclosure. Obviously, the described embodiments are merely some, rather than all, of the embodiments of the present disclosure. Based on the embodiments in the present disclosure, all other embodiments obtained by those with ordinary skill in the art without creative efforts should fall within protective scope of the present disclosure.

As stated above, there are several issues with the conventional systems. First, the functions that can be implemented by similar hardware modules in the current SOC system are limited. Second, the functions are controlled by a function register inside the modules. Systems often need to perform various bitwise operations, which are operations on bit patterns or binary numerals that involve manipulations of individual bits. To perform different bitwise operations, the internal control register needs to be switched constantly. As a result, overhead of the instruction space will surface.

Figure 1:
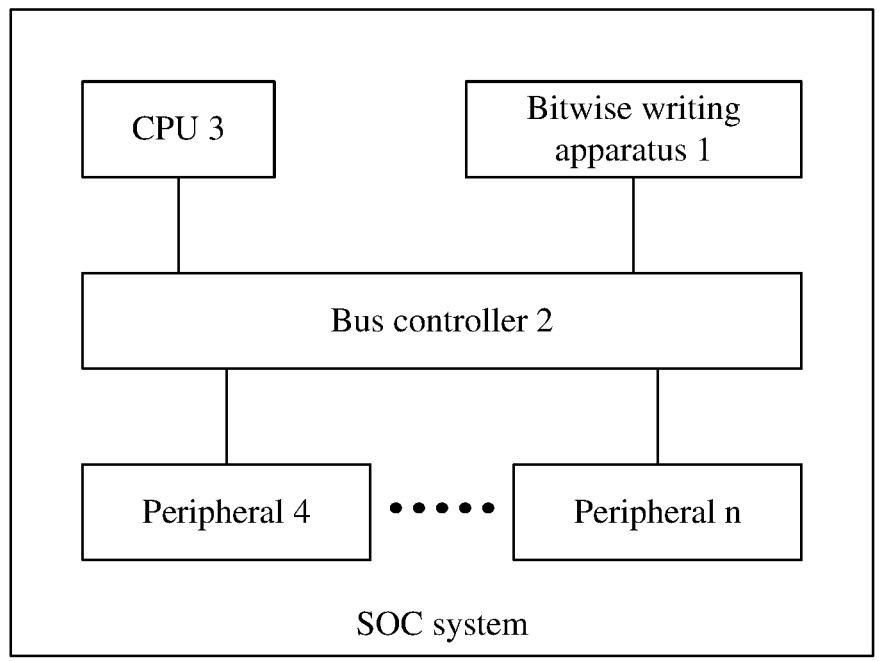
FIG. 1 is a schematic diagram of an exemplary bitwise writing apparatus for an SOC system, according to some embodiments of the present disclosure.

The present disclosure overcomes these issues by providing a bitwise writing apparatus for an SOC system. FIG. 1 is a schematic diagram of an exemplary bitwise writing apparatus for an SOC system, according to some embodiments of the present disclosure. As shown in FIG. 1, bitwise writing apparatus 1 is connected to bus controller 2 in the SOC system and is connected to a master device (e.g., CPU 3) and peripherals 4-n through bus controller 2. Bitwise writing apparatus 1 is independent of bus controller 2, the master device, and peripherals 4-n.

Figure 2:
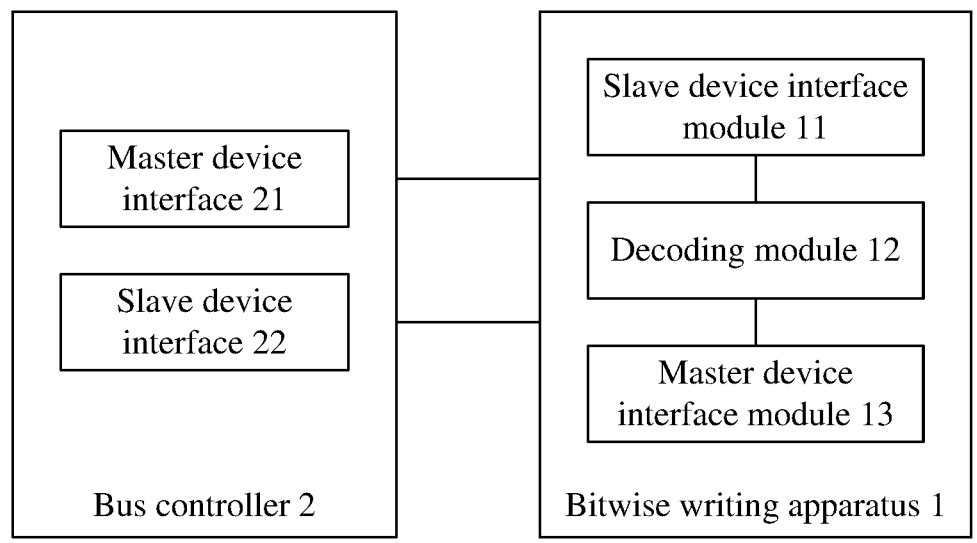
FIG. 2 is a schematic diagram of an exemplary connection between a bitwise writing apparatus for an SOC system and a bus controller, according to some embodiments of the present disclosure.

FIG. 2 is a schematic diagram of an exemplary connection between a bitwise writing apparatus for an SOC system and a bus controller, according to some embodiments of the present disclosure. As shown in FIG. 2, bitwise writing apparatus 1 is connected to a master device interface 21 of bus controller 2 and a slave device interface 22 of bus controller 2. Bitwise writing apparatus 1 comprises a slave device interface module 11, a decoding module 12, and a master device interface module 13.

Slave device interface module 11 is configured to receive a write request sent by master device interface 21 of bus controller 2 and to send the write request to decoding module 12. The write request includes a mapping address and an operation data.

In some embodiments, slave device interface module 11 is configured to control and receive a valid write request sent by master device interface 21 of bus controller 2.

Decoding module 12 is configured to receive the write request sent from slave device interface module 11, to decode the write request, and to send valid information after decoding to master device interface module 13. The valid information after decoding includes a destination address, bit selection information, and bit valid data.

In some embodiments, decoding module 12 is configured to convert the mapping address in the write request into a corresponding destination address and a bit selection information according to an agreed mapping relationship.

Master device interface module 13 is configured to receive the valid information sent from decoding module 12, to read data in the destination address, to perform a bitwise operation on the read data to obtain new data, to send a write request to slave device interface 22, and to write the obtained new data into a peripheral register corresponding to the destination address.

In some embodiments, master device interface module 13 is configured to modify according to the bit selection information a designated bit of the read data into the bit valid data to obtain new data.

The bitwise writing apparatus for an SOC system provided in the present disclosure is an independent apparatus located between the master device and the bus controller. The bitwise write operation of the bitwise writing apparatus has a different mode of implementation from those located in the bus, the master device, or the slave device.

The bitwise writing apparatus is implemented in the following steps. For a bitwise write operation initiated by a CPU, first the write operation is sent to the bus controller, then the bus controller sends a request to the bitwise writing apparatus. The bitwise writing apparatus then decodes the write operation to convert the write operation into a bitwise write operation on the bus. Due to its independence from other devices, this mode of implementation allows for a more convenient extension to an existing system.

The bitwise writing apparatus for an SOC system in the present disclosure can be applied in a system in which software of an SOC system has frequent bitwise write operations. The bitwise writing apparatus receives a write request corresponding to a mapping address. Upon detecting that the write request corresponding to the mapping address is valid, the bitwise writing apparatus decodes the valid write request. After the decoding, the bitwise writing apparatus initiates a read request, a bitwise operation, and a write request to complete the bitwise write operation. The bitwise writing apparatus can convert the three instructions (e.g., the read request, the bitwise operation, and the write request) into one bitwise write request for implementation. Therefore, at least in an SOC system having frequent bitwise operations, the bitwise writing apparatus can effectively reduce the instruction storage space and thereby achieve the objective of lowering the cost of hardware resources.

Figure 3:
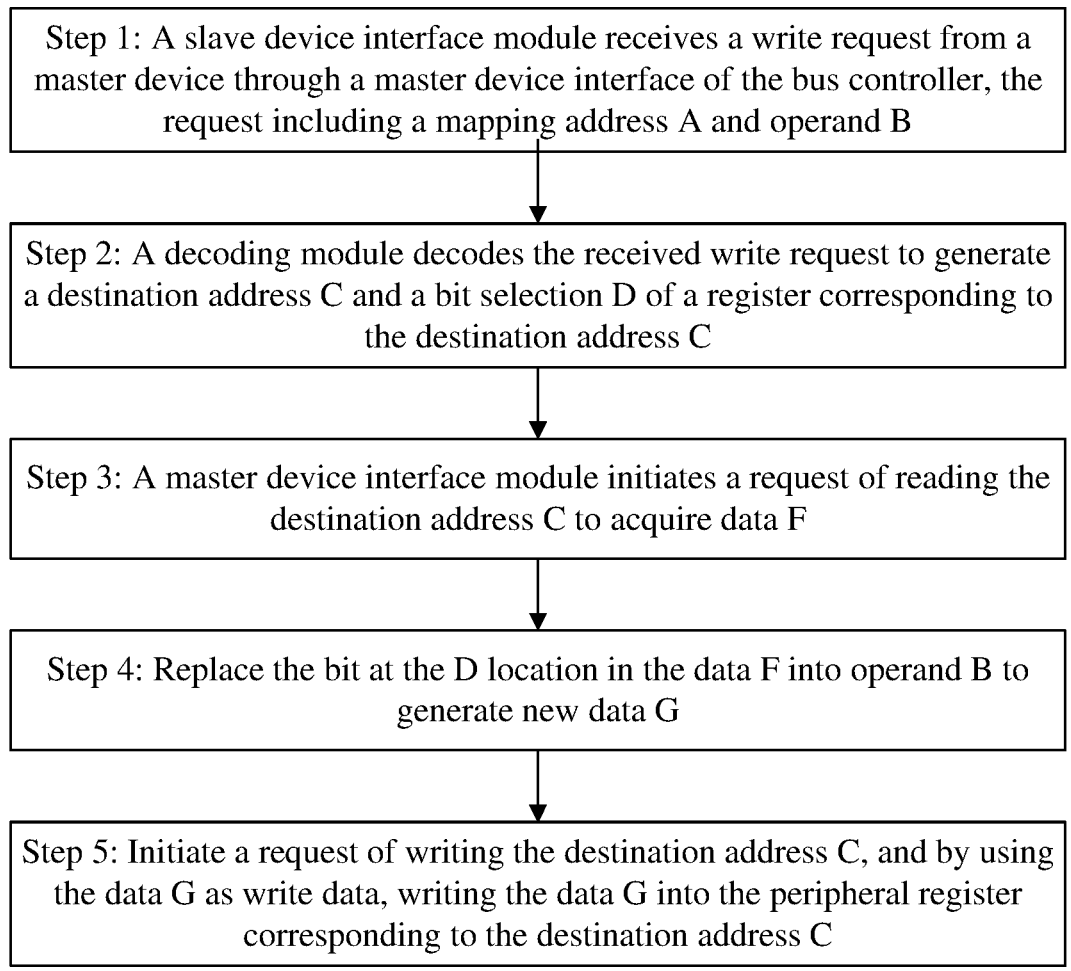
FIG. 3 is a flowchart of an exemplary implementation solution of a bitwise writing apparatus for an SOC system, according to some embodiments of the present disclosure.

FIG. 3 is a flowchart of an exemplary implementation solution of a bitwise writing apparatus for an SOC system, according to some embodiments of the present disclosure. According to FIG. 3, in step 1, a slave device interface module (e.g., slave device interface module 11) receives a write request from a master device (e.g., CPU 3) through a master device interface (e.g., master device interface 21) of a bus controller (e.g., bus controller 2), and the request includes a mapping address A and operand B.

In some embodiments, the slave device interface module is responsible for maintaining and controlling a valid write request sent by the master device interface of the bus controller and receiving write request information sent by the master device interface of the bus controller. At the same time the slave device interface module is responsible for performing data processing on the received information and sending the processed information to a decoding module (e.g., decoding module 12 of bitwise writing apparatus 1), hence completing data communication with the decoding module.

For example, the slave device interface module receives one write request initiated by the master device interface of the bus controller. The request address belongs to the bitwise writing apparatus for the SOC system, and requests of other addresses are arbitrated by the bus.

Figure 4:
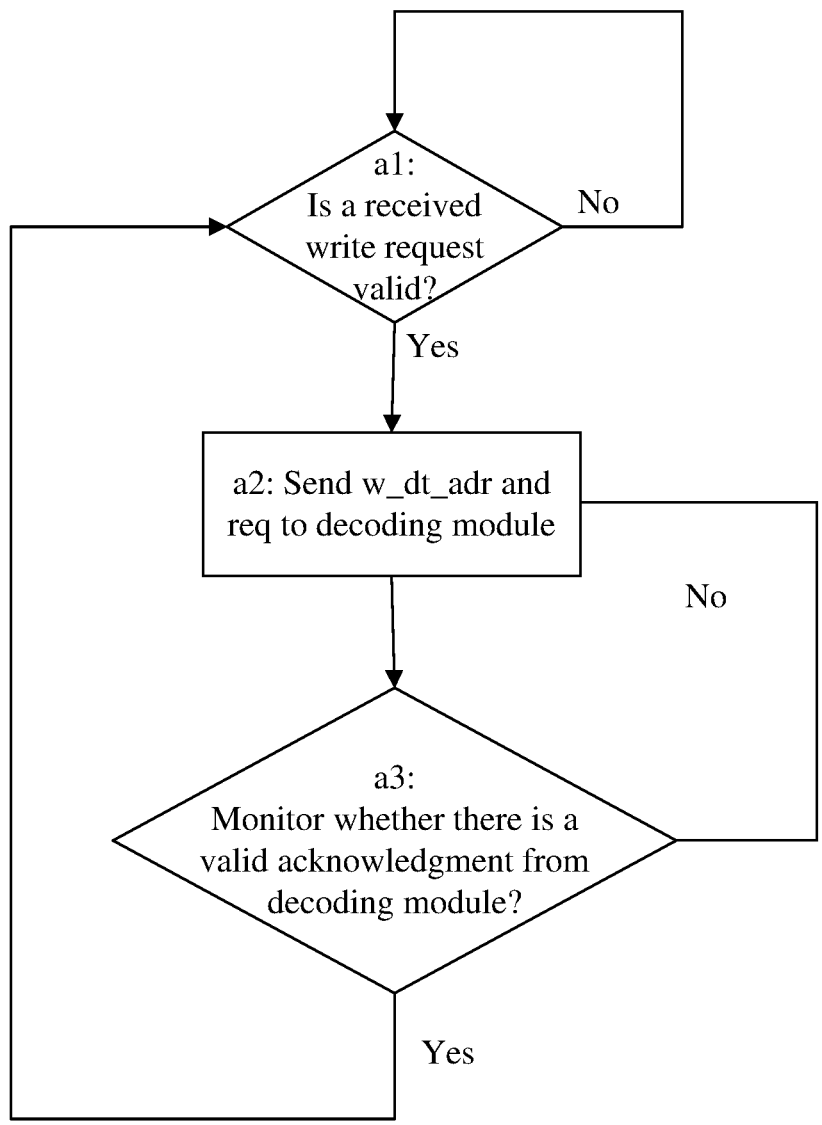
FIG. 4 is a flowchart of an exemplary implementation solution of a slave device interface module, according to some embodiments of the present disclosure.

In some embodiments, the write request received by the slave device interface module includes a write address, a bit selection control, a valid bit for write data and bit data information, rather than a normal write address and an operation data. FIG. 4 is a flowchart of an exemplary implementation solution of a slave device interface module, according to some embodiments of the present disclosure.

In step a1, a received write request signal of a master device is monitored. If it is detected that the received write request signal is valid (e.g., equal to 1), step a2 is performed. If the received write request signal is not valid (e.g., equal to 0), the slave device interface module continuously monitors subsequent received write request signals.

In step a2 after the valid write request signal is detected, a received write address and operation data (w_dt_adr) and request signal (req) are sent to the decoding module, wherein the request signal (req) is set to be valid (e.g., set to 1).

In step a3, the slave interface module monitors whether a valid acknowledgment signal (ack) from the decoding module is received. If it is detected that the valid acknowledgment signal is received and the valid acknowledgment signal (ack) is valid (e.g., equal to 1), the request signal (req) is cleared (e.g., set to 0), and then step a1 is performed. If the valid acknowledgment signal is not valid (e.g., equal to 0), the slave interface module continues to monitor whether a subsequent valid acknowledgment signal is received.

Referring back to FIG. 3, in step 2, after the decoding module receives the write address and operation data (w_dt_adr) and request signal (req), the decoding module decodes the received write address and operation data (w_dt_adr) to generate a destination address C and a bit selection D corresponding to the destination address C.

In some embodiments, the decoding module is responsible for decoding encoded information received from the slave device interface module and sending valid information after the decoding to the master device interface module. The mode of implementing the decoding module of the bitwise writing apparatus is superior to the decoding mode of a conventional internal control register. In conventional systems, configuration bit selection control and bit valid data of the internal control register need to occupy instruction space. In the decoding mode of the disclosed bitwise writing apparatus, however, an address, bit selection control, and bit data information are obtained directly by decoding an address and operation data in a current write request of a master control interface of the register. Compared with the conventional decoding mode of configuring the register, the direct decoding mode used by the disclosed bitwise writing apparatus can save the instruction storage space.

Figure 5:
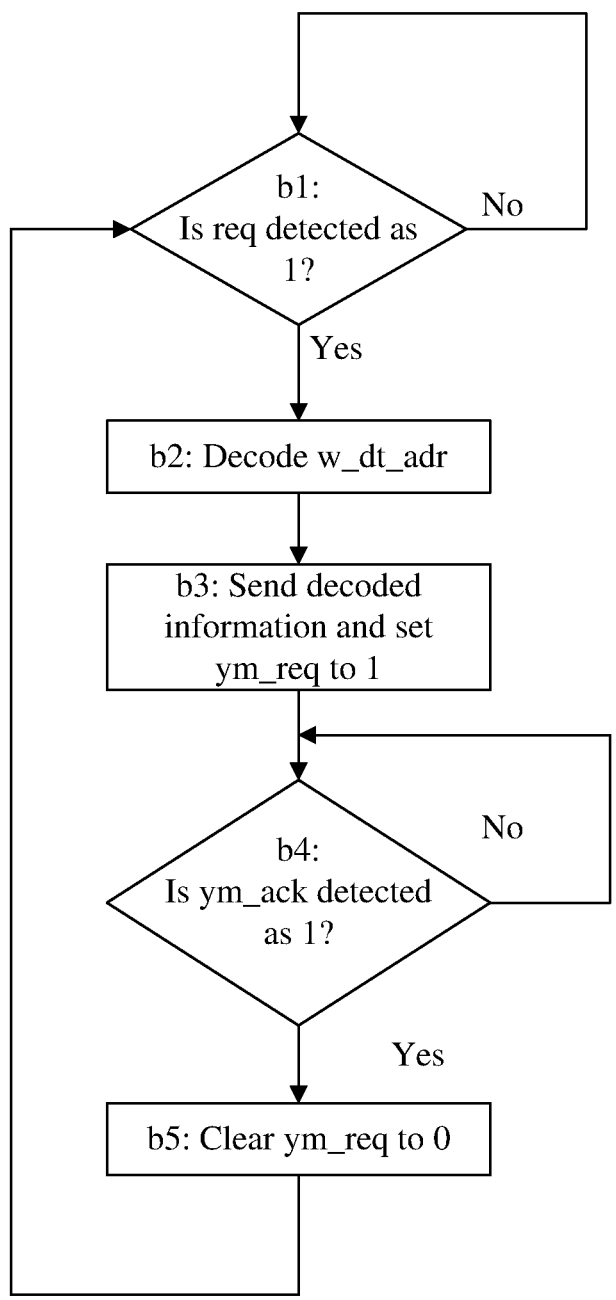
FIG. 5 is a flowchart of an exemplary implementation solution of a decoding module, according to some embodiments of the present disclosure.

FIG. 5 is flowchart of an exemplary implementation solution of the decoding module, according to some embodiments of the present disclosure.

In step b1, the request signal (req) sent by the slave device interface module is monitored. If the request signal (req) is detected to be valid (e.g., equal to 1), step b2 is performed. If the request signal (req) is not valid (e.g., equal to 0), the decoding module continuously monitors subsequent request signals (req).

In step b2, decoding is performed according to the write address and operation data (w_dt_adr) received from the slave interface module to obtain a destination address C, a bit selection D, and an operand B.

In step b3, the decoding module sends the destination address C, the bit selection D, and the operand B that are obtained in step b2 to the master device interface module.

The decoding module also sends a read request signal (ym_req) to the master device interface module, wherein the read request signal (ym_req) is set to be valid (e.g., set to 1).

In step b4, the decoding module monitors whether an acknowledgment signal (ym_ack) from the master device interface module is received. If it is detected that the acknowledgment signal (ym_ack) is received and the acknowledgment signal (ym_ack) is valid (e.g., equal to 1), step b5 is performed. If the acknowledgment signal (ym_ack) is not valid (e.g., equal to 0), the decoding module continues to monitor whether a subsequent acknowledgment signal is received.

In step b5, the read request signal (ym_req) is cleared (e.g., set to 0), and then step b1 is performed.

According to an agreed mapping relationship, the decoding module maps the mapping address A into 1) the destination address C, and 2) the bit selection D in the peripheral register corresponding to the destination address C. The decoding module then converts the write request information of the master device into peripheral bitwise operation information provided to the master device interface module.

For example, the decoding mode of the decoding module works as follows: write address and operation data (w_dt_adr) come from both an address signal (w_adr) and a data signal (w_dt) that are received by the slave device interface module. The bit selection D comes from a lower bit of the address signal (w_adr) (e.g., if a bus has a 32-bit data width, the bit selection D comes from the lower 5 bits). The valid bit for write data can be the lower two bits of the address signal (w_adr), which are used to determine from which bit of the data signal (w_dt) the operand B comes. If the lower two bits of the address signal (w_adr) are 0, the operand B, which represents the bit data information, comes from the bit 0 of the data signal (w_dt). If the lower two bits of the address signal (w_adr) are 1, the operand B comes from the bit 8 of the data signal (w_dt). If the lower two bits of the address signal (w_adr) are 2, the operand B comes from the bit 16 of the data signal (w_dt). If the lower two bits of the address signal (w_adr) are 3, the operand B comes from the bit 24 of the data signal (w_dt).

Referring back to FIG. 3, in step 3, the master device interface module initiates a request to read the destination address C in order to acquire data F.

In step 4, the bit at the D location of data F is replaced with operand B to generate new data G.

In step 5, a request to write the destination address C is initiated and new data G is used as write data, and the new data G is written into the peripheral register corresponding to the destination address C.

Figure 6:
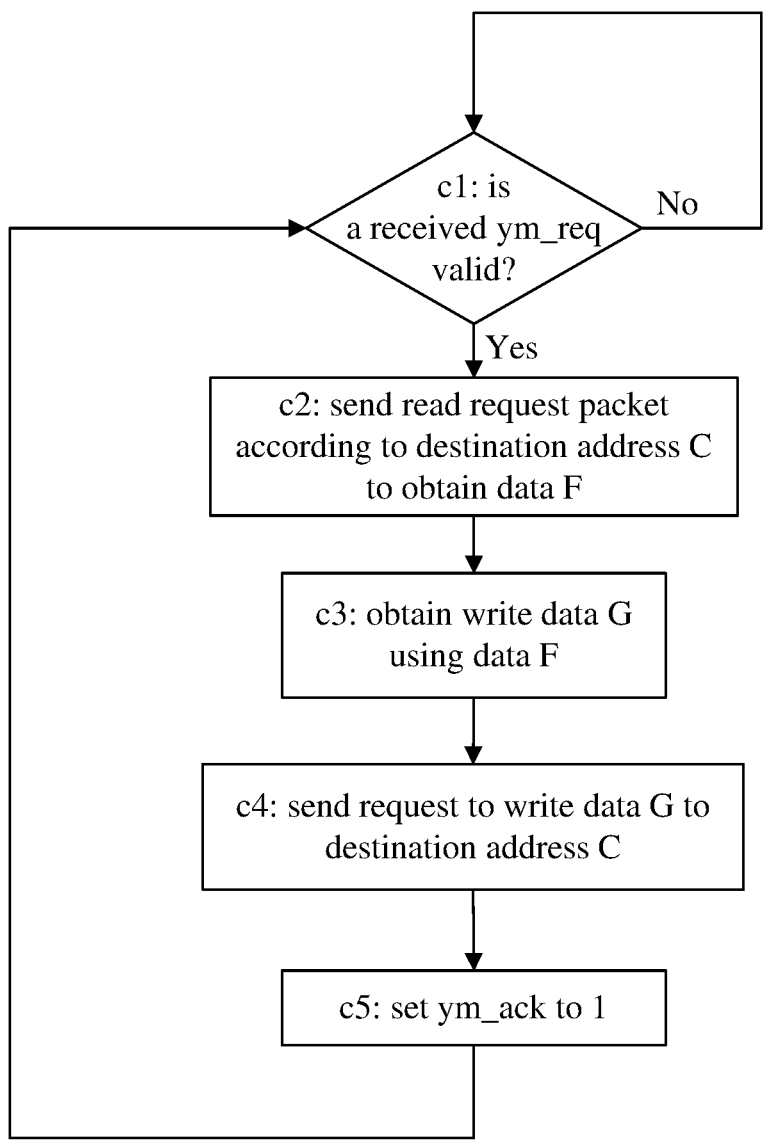
FIG. 6 is a flowchart of an exemplary implementation solution of a master device interface module, according to some embodiments of the present disclosure.

In some embodiments, the master device interface module (e.g., master device interface module 13 of FIG. 2) first initiates according to the received decoded information a read request to the slave interface of the bus controller to obtain read data. The master device interface module then processes the decoded data and the read data according to the decoded information and sends a write request to the slave interface of the bus controller, thereby completing the bitwise write operation. FIG. 6 is a flowchart of an exemplary implementation solution of the master device interface module, according to some embodiments of the present disclosure.

In step c1, the master device interface module monitors whether a received read request signal (ym_req) is valid (e.g., equal to 1). If so, step c2 is performed. If, however, the read request signal is not valid (e.g., equal to 0), the master device interface module continues to monitor whether a received read request signal is valid.

In step c2, after it is detected that the read request signal (ym_req) is valid, a read request packet is sent to the bus according to the destination address C obtained by decoding in order to obtain data F.

In step c3, after the read request is completed, a bit at the D location of data F is replaced with operand B to obtain write data G.

In step c4, a request to write data G to the destination address C is sent to the slave device interface of the bus controller.

In step c5, an acknowledgment signal (ym_ack) is set to be valid (e.g., set to 1), and then step c1 is performed.

In the bitwise writing apparatus for an SOC system provided in the embodiments of the present disclosure, a slave device interface module receives a write request sent by the master device interface of a bus controller and sends received address and data to a decoding module. The decoding module decodes the received address and data information and then sends valid information after the decoding to a master device interface module. The master device interface module first sends a read request to a slave interface module of the bus controller according to the received decoded information to obtain read data, and then processes the decoded data and the read data according to the decoded information and sends a write request to the slave interface of the bus controller, thus implementing a function of a bitwise write operation. Compared with the conventional systems, embodiments of the present disclosure can directly obtain an address and data of a write request by decoding in a manner that a bitwise write operation of the master device is converted into one write request for implementation, therefore effectively reducing the instruction storage space and lowering the chip cost.

It is appreciated that while the application indicates that setting of a bit to be valid corresponds to the bit being equal to "1," for some implementations, the setting of a bit to be valid could also correspond to the bit being equal to "0."

It is appreciated that all or a part of the process in the method according to the above embodiments can be implemented through a computer program instructing the related hardware. The program can be stored in a computer readable storage medium. During execution, the program can comprise processes of the embodiments of the above methods, wherein the storage medium can be a magnetic disk, an optical disc, a Read-Only Memory (ROM), a Random Access Memory (RAM), and the like.

Some specific embodiments of the present disclosure are described above, but the protective scope of the present disclosure is not limited to these embodiments. Any variation or substitution that can be easily conceived of by those skilled in the art within the technical scope disclosed by the present disclosure shall fall within the protective scope of the present disclosure. Therefore, the protective scope of the present disclosure shall be subject to the protective scope of the claims.

The invention claimed is:

1. A bitwise writing apparatus for a System on Chip (SOC) system, the bitwise writing apparatus being communicatively coupled to a master device interface of a bus controller and a slave device interface of the bus controller, and the bitwise writing apparatus comprising:
   a decoding module configured to receive a write request and to decode the write request to acquire a destination address, bit selection information, and bit valid data; and a master device interface module configured to:
receive the destination address, the bit selection information, and the bit valid data from the decoding module, read data in the destination address to obtain read data;
perform a bitwise operation for the read data to obtain new data according to bit selection information and bit valid data, and
send a write request to the slave device interface of the bus controller and write the obtained new data into a peripheral register corresponding to the destination address.

2. The bitwise writing apparatus according to claim 1, further comprising a slave device interface module configured to receive a write request sent by the master device interface of the bus controller, wherein the write request comprises a mapping address and operation data.

3. The bitwise writing apparatus according to claim 2, wherein the slave device interface module is further configured to control the write request sent by the master device interface of the bus controller.

4. The bitwise writing apparatus according to claim 2, wherein the write request further comprises bit selection control, valid bit control of write-bit data, and bit data information.

5. The bitwise writing apparatus according to claim 2, wherein the slave device interface module is further configured to receive and detect a valid acknowledgment signal from the decoding module.

6. The bitwise writing apparatus according to claim 2, wherein the decoding module is further configured to convert the mapping address in the received write request into a corresponding destination address and a bit selection information according to an agreed mapping relationship.

7. The bitwise writing apparatus according to claim 2, wherein the bit selection information comprises one or more bits from the lower bits in the mapping address.

8. The bitwise writing apparatus according to claim 1, wherein the decoding module is further configured to receive and detect an acknowledgment signal from the master device interface module.

9. The bitwise writing apparatus according to claim 1, wherein the master device interface module is further configured to modify, according to the bit selection information, a designated bit of the read data into bit valid data after the decoding to obtain the new data.

10. The bitwise writing apparatus according to claim 1, wherein the master device interface module is further configured to send an acknowledgement signal to the decoding module after the write request is completed.

11. A bitwise writing method for a System on Chip (SoC) system, comprising:
receiving a write request from a master device;
decoding the write request to acquire a destination address, bit selection information, and bit valid data;
reading data in the destination address to obtain read data;
performing a bitwise operation for the read data to obtain new data according to the bit selection information and the bit valid data;
sending a write request to a slave device and writing the obtained new data into a peripheral register corresponding to the destination address.

12. The bitwise writing method according to claim 11, wherein the write request comprises a mapping address and operation data.

13. The bitwise writing method according to claim 12, wherein decoding the write request to acquire a destination address, bit selection information, and bit valid data further comprises converting the mapping address in the write request into a corresponding destination address and a bit selection information according to an agreed mapping relationship.

14. The bitwise writing method according to claim 11, wherein the write request further comprises bit selection control, valid bit control of write-bit data, and bit data information.

15. The bitwise writing method according to claim 1, wherein decoding the write request to acquire a destination address, bit selection information, and bit valid data further comprises sending a valid acknowledgment signal.

16. The bitwise writing method according to claim 11, wherein the bit selection information comprises one or more bits from the lower bits in the mapping address.

17. The bitwise writing method according to claim 11, wherein performing a bitwise operation for the read data to obtain new data according to bit selection information and bit valid data further comprises modifying, according to the bit selection information, a designated bit of the read data into the bit valid data after the decoding to obtain the new data.

18. The bitwise writing method according to claim 1, wherein sending a write request to a slave device and writing the obtained new data into a peripheral register corresponding to the destination address further comprises sending an acknowledgement signal after the write request is completed.

* * * * *

UNITED STATES PATENT AND TRADEMARK OFFICE
CERTIFICATE OF CORRECTION

PATENT NO. : 10,824,578 B2
APPLICATION NO. : 16/479580
DATED : November 3, 2020
INVENTOR(S) : Aiyong Ma et al.

It is certified that error appears in the above-identified patent and that said Letters Patent is hereby corrected as shown below:

On the Title Page

Item (30), in the Foreign Application Priority Data, "2017 1 1465004" should read --201711465004.7--.

In the Claims

In Claim 15, Column 8, Line 28, "according to claim 1," should read --according to claim 11,--.

In Claim 18, Column 8, Line 43, "according to claim 1," should read --according to claim 11,--.

Signed and Sealed this
Twelfth Day of November, 2024

Katherine Kelly Vidal
*Director of the United States Patent and Trademark Office*